United States Patent [19]

Becavin

[11] 3,713,160
[45] Jan. 23, 1973

[54] TRANSMITTER MONITORS FOR ILS BEACONS

[75] Inventor: Henri Becavin, Paris, France

[73] Assignee: Thomson-CSF

[22] Filed: Dec. 10, 1970

[21] Appl. No.: 96,896

[30] Foreign Application Priority Data

Dec. 19, 1969 France..................................6944102

[52] U.S. Cl. .............343/109, 343/100 AP, 343/108
[51] Int. Cl................................................G01s 1/16
[58] Field of Search.........................343/109, 100 AP

[56] References Cited

OTHER PUBLICATIONS

I.E.E.E. Transactions on Aerospace and Electronic Systems, September, 1966, pp. 618.

Primary Examiner—Benjamin A. Borchelt
Assistant Examiner—Denis H. McCabe
Attorney—Edwin E. Greigg

[57] ABSTRACT

In a localizer beacon of the ILS system, analog signals derived from the two lateral antennas by means of probes coupled thereto are phase-shifted by equal angles, disregarding multiples of $2\pi$. The analog signals respectively corresponding to the lateral antennas are separately added. The two sum signals thus obtained are added together to supply the HF signal representative of the radiation in the reference plane containing the center line of the runway. They are also subtracted from each other to supply a second HF signal representative of the variation of the d.d.m. as a function of the azimuth. This second signal is attenuated and phase-shifted, and part of the first HF signal added thereto, so that any variation of the d.d.m. in the resultant signal indicates a variation of the second signal.

5 Claims, 1 Drawing Figure

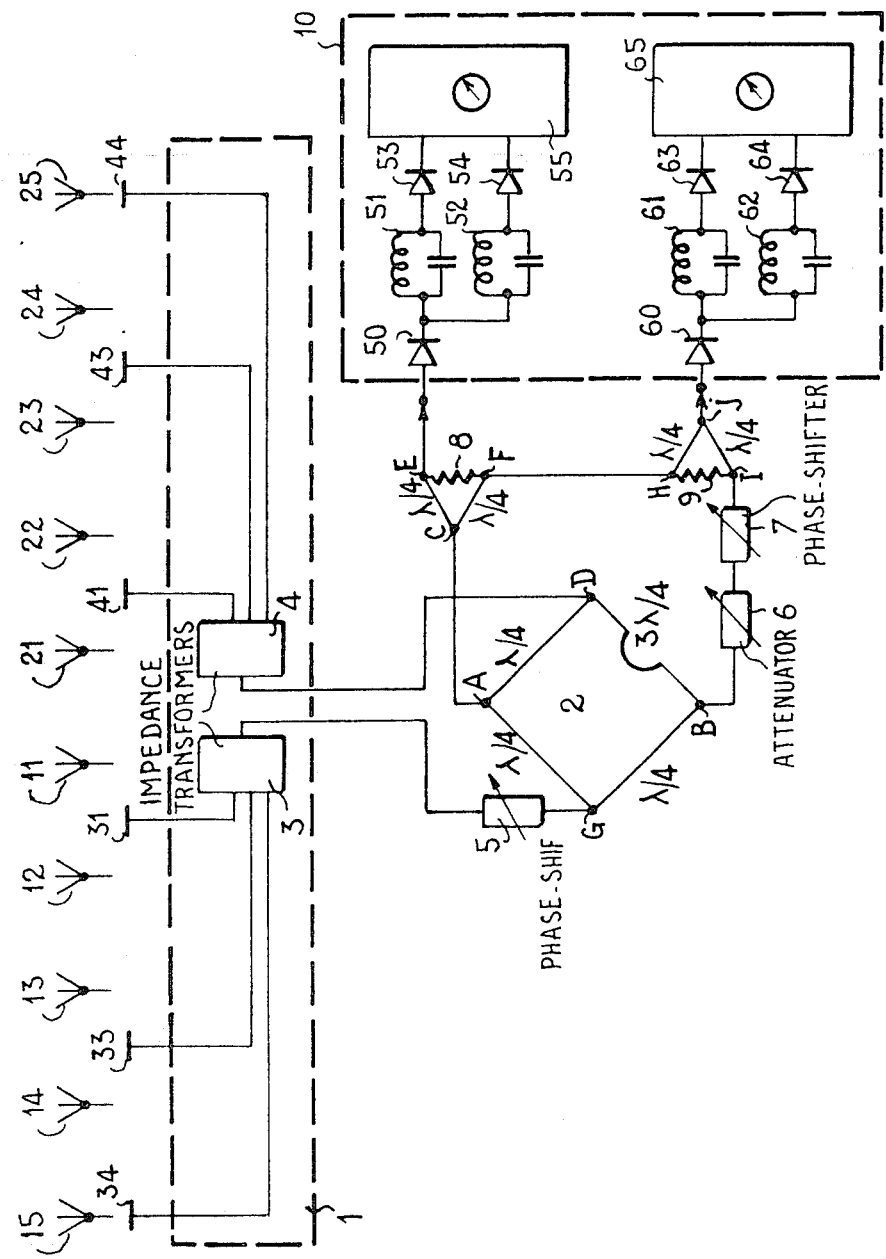

TRANSMITTER MONITORS FOR ILS BEACONS

The present invention relates to improvements in transmitter monitors for ILS localizer beacons.

The radiation from such a beacon can be characterized by the vector sum of two signals, namely a reference signal designated CSB (carrier sideband) constituted by a carrier wave having a frequency P, which is 20 percent modulated at 90 c/s and 20 percent at 150 c/s, and a signal designated SBO (sideband only), made up of sidebands at 90 c/s and 150 c/s.

The reference signal is transmitted symmetrically vis-a-vis the reference plane, i.e., the vertical plane containing the center line of the runway, whilst the SBO signal is transmitted in an asymmetrical fashion.

More precisely, the beacon comprises two lateral antennas symmetrically located relatively to the reference plane. One of the lateral antennas radiates waves at the frequencies $P \pm 90$ c/s which are phase-shifted by $-90°$ relatively to the corresponding side frequencies of the reference signal and waves at the frequencies $P \pm 150$ c/s which are phase-shifted by $+90°$ relatively to the corresponding side frequencies of the reference signal, this signal being hereinafter referred to as the $SBO_1$ signal.

The other lateral antenna radiates waves with the same frequencies, respectively in antiphase with respect to those of the $SBO_1$ signal, this second signal being hereinafter referred to as the $SBO_2$ signal.

The $SBO_1$ and $SBO_2$ signals form the SBO signal.

The reference signal may be radiated by a central antenna, or by the two lateral antennas, or partly by a central antenna and partly by the two lateral antennas.

By "difference in depth of modulation" (usual abbreviation: d.d.m.) is meant the difference between the depths of modulation of the carrier of the reference signal, respectively for the 90 c/s and 150 c/s modulating frequencies, taking into account the presence of the SBO signal. This difference, which is a function of the azimuth and is zero in the reference plane, is the information used in the receivers of the aircrafts.

The two chief quantities to be monitored permanently are:

on the one hand the value of the d.d.m. at long range (i.e. at the entrance of the runway) in the reference plane and on the other hand the variation of the d.d.m. as a function of the azimuth $\theta$ at the same distance.

In view of the transmission characteristics, it will be appreciated that a zero value of the d.d.m. in the reference plane namely depends upon:

equality between the modulation indices for the two modulating frequencies in the reference signal;

stability of the antiphase condition between the corresponding components of the $SBO_1$ and $SBO_2$ signals.

On the other hand, the slope of the variation of the d.d.m. as a function of the azimuth depends primarily upon the overall amplitude of the components of the $SBO_1$ and $SBO_2$ signals, assumed to be added in phase.

For monitoring the transmission, different arrangements are employed, one of which uses near field monitoring, the information on the transmitted beams being picked up in the immediate neighborhood of the radiator elements of the beacon.

The present invention is concerned with this category of monitoring, which makes it possible to overcome the drawbacks arising from the environment and also enables full monitoring of the radiation characteristics to be carried out.

In known monitoring devices of this kind, the voltages picked up by a number of small receiving antennas or probes located close to the transmitter antennas, are processed. A system of this kind is described, for example, in the "I.E.E.E. Transactions on Aerospace and Electronic Systems," September, 1966, page 618, in an article entitled "An integral monitor for the ILS localizer." In this device, the current from each radiator element of the antenna is sampled by an associated probe, the samples being split and directed to a lefthand channel and a righthand channel by means of a power splitter. In each channel, the voltage of each sample is given a phaseshift of a value corresponding on the one hand to a predetermined azimuthal angle, $\theta_o$ for one channel, and $-\theta_o$ for the other one, and on the other hand to the position of the considered probe; these voltages are added. The resultant signal from each channel is applied to a measuring circuit which indicates the corresponding d.d.m. for the directions $\theta_o$ and $-\theta_o$.

In order to obtain the reference plane signal from these two righthand and lefthand signals, the outputs of the two channels are respectively connected to opposite terminals of a first diagonal of a bridge-type hybrid junction. The terminals of the other diagonal of the bridge, respectively supplying the difference and the sum of the two input signals, are respectively connected to a load which is earthed and to an attenuator feeding a measuring circuit. The difference signal is not used.

This system makes it possible to get rid of proximity errors. However, it ought to be pointed out that the system described does not strictly speaking reflect the true situation as concerns the signal in the reference plane, since this signal is derived from the $\theta_o$ and $-\theta_o$ signals, the value $\theta_o$ not being negligible.

It follows, therefore, that possible variations in the radiated fields, whether they be in amplitude or in phase, will not affect in the same way the system described and a receiver located in the reference plane.

The transmitter monitor in accordance with the invention, which differs from the known monitor in particular, in that the reference plane signal is derived from analog signals which have been phase-shifted by phase-shifts corresponding to the 0 value of the azimuth at long range, i.e., analog signals which have been phase-shifted by the same angle, disregarding multiples of $2\pi$ (and this very simply by means of a transmission line) obviates this drawback. Moreover, it simultaneously delivers a high quality signal representative of the variation of the d.d.m., parallax effects being eliminated.

According to the invention, there is provided a monitor for an ILS localizer beacon comprising first and second lateral antennas having radiator elements, said monitor comprising: $n$ first probes, where $n$ is a positive integer, coupled to said radiator elements of said first lateral antenna, and $n$ second probes coupled to said radiator elements of said second lateral antenna, for deriving analog signals proportional to the currents in said radiator elements; first and second impedance transformers, each having at least $n$ inputs and an output, for supplying on said output the sum of its input signals; a transmission line having conductors connecting said $n$ first probes respectively to said $n$ inputs of said first impedance transformer and said $n$ second probes respectively to said $n$ inputs of said second impedance transformer, the electrical lengths of said conductors being such that each analog signal is phase-shifted by the same angle, disregarding multiples of $2\pi$; and an HF circuit having first and second inputs, a sum output for supplying thereto the sum of its input signals, and a difference output for supplying thereto the difference of its input signals, said first and second inputs of said HF circuit being respectively coupled to said outputs of said first and second impedance transformers.

An embodiment of the transmitter monitor in accordance with the invention, given here by way of a non-limitative example, will now be described making reference to the single FIGURE attached hereto.

It has been assumed that the monitored beacon did not include a central antenna, the reference signal feeding in the same way the two lateral antennas, and that each of the lateral antennas was an array of radiating elements.

In the FIGURE, the first lateral antenna comprises radiator elements 11 to 15 and the second one the radiator elements 21 to 25. Probes 31, 33 and 34 and 41, 43 and 44 respectively are electromagnetically coupled to the radiator elements of the two antennas, in order to supply the analog signals. A transmission line 1, centered in the reference plane, carries the probes and the inner conductors of the line connects them, respectively for the two antennas, to two impedance transformers 3 and 4.

The electrical lengths of the conductors connecting the probes to the two impedance transformers are such that all the analog signals are phase-shifted by the same angle, disregarding multiples of $2\pi$.

The two transformers sum up their respective input signals and deliver two signals respectively corresponding to the fields respectively radiated at long range in the reference plane by the two antennas.

In the embodiment described, each probe is constituted by a symmetrical rectilinear antenna, that is to say a dipole mounted on a support which is terminated in a coaxial connection designed for coupling to the transmission line. Dipoles will generally fit in readily with existing installations and their coupling to the radiator elements is facilitated by an adjustable conductor located at the end of the half-dipole, which makes it possible to adjust the length of the latter. This coupling is regulated in order to take into account the power levels radiated at long range, while avoiding undesirable coupling. The transmission line 1 is a line which is insensitive to climatic variations, mechanically rigid. A line of this kind will advantageously be produced by fitting insulated conductors on an insulating support, these conductors being parallel to a metal cap forming the external conductor, the space between internal conductors and cap containing air.

In this fashion, the field is concentrated between the cap and the inner conductors and the locations of the coaxial tappings for the probes can be selected as a function of the distribution of the lines of force inside the coaxial line.

The impedance transformers 3 and 4 may be conventional quarter-wave transformers. Their outputs are respectively coupled to the two inputs G and D of a hybrid bridge junction 2, with terminals G D A B.

A variable phase-shifter is inserted between the output of the transformer 3 and the input G is designed to correct phase errors in the device resulting from design imperfections.

Since the bridge arms GA and DA have the same length, i.e., a quarter of the wavelength, there is obtained at the "sum output" A of the circuit 2 a signal $S_1$, which is the sum of the output signals of the impedance transformers 3 and 4, and represents in amplitude and phase the field radiated at long range in the reference plane by the two antennas.

The bridge arms GB and DB are of different length, respectively a quarter and three quarters of a wavelength, and there is obtained at the "difference output" B a signal $S_2$ corresponding to the field which would be radiated in this same location if the reference signal were not present and if the lateral antennas were fed in phase as concerns the SBO signal.

According to what has been said hereinabove, signal $S_2$ is thus representative of the variation of the d.d.m. in the neighborhood of $\theta = 0$.

Of course, any device electrically equivalent to circuit 2 may be used instead of the latter.

The output B of the circuit 2 is followed by a variable attenuator 6 and a variable phase-shifter 7, the output I of which delivering a signal $S'_2$ which is a function of $S_2$ and of the adjustments of the elements 6 and 7.

A device is on the other hand provided in order to add to signal $S'_2$ part of the reference signal.

This device comprises a power splitter 8, with an input C and two outputs E,F, the input C being connected to the output A of the circuit 2. This power splitter comprises two coaxial cables of 70 ohms impedance equal in length to a quarter wavelength, respectively connecting the terminals C and E and C and F, and a 100 ohms resistor inserted between the terminals E and F.

The device comprises an element 9, identical to the power splitter, but used as an adder. One of the terminals H of the resistor of the element 9 is connected to the terminal F of the power splitter 8, the other one being connected to the output I of the phase-shifter 7. The output of the adder is the third terminal J, connecting the two coaxial cables.

The terminals E and J are the HF outputs of the monitor device, the first one supplying signal $S_1$, at half-power, and the second one a signal $S''_2$, which is the sum of signal $S'_2$ and of part of signal $S_1$.

The terminals E and J are connected to the two inputs of a device 10 comprising two circuits. The terminal E feeds therein a conventional circuit comprising an HF detector diode, 50, the latter feeding in parallel two band-pass filters 51 and 52 respectively tuned to the 90 and 150 c/s frequencies, those two filters being respectively followed by two detector diodes 53 and 54. The outputs of the two diodes 53 and 54 control a display device 55 supplying the indication of the value of the d.d.m. in the reference plane.

The output J feeds a similar circuit, the elements of which are designated by reference number exceeding by 10 the reference numbers of the corresponding elements of the first circuit.

The indicator device 65, which measures the value of the d.d.m. in the signal $S''_2$ makes it possible to check the value of signal $S_2$ in the following way: When the transmission characteristics have been recognized as correct in the conventional way, the attenuator 6 and phase-shifter 7 are so adjusted that the device 65 displays a predetermined value for the d.d.m.; any subsequent departure from this value (with the same adjustments of the elements 6 and 7) will indicate that signal $S_2$ has no longer the correct value.

If the localizer beacon further comprises a central antenna for radiating the whole or part of the reference signal, a probe associated with the central antenna will supply an analog signal which can be added to the sum signal from circuit 2 in an adder inserted between the terminal A of this circuit 2 and the power divider 8, the remainder of the monitor being otherwise unchanged.

Of course, the invention is not limited to the embodiment described and shown which was given solely by way of example.

What is claimed, is:

1. A monitor for an ILS localizer beacon comprising first and second lateral antennas having radiator elements, said monitor comprising: n first probes, where n is a positive integer, coupled to said radiator elements of said first lateral antenna, and n second probes coupled to said radiator elements of said second lateral antenna, for deriving analog signals proportional to the currents in said radiator elements; first and second impedance transformers each having at least n inputs and an output, for supplying on said output the sum of its input signals; a transmission line having conductors connecting said n first probes respectively to said n inputs of said first impedance transformer and said n second probes respectively to said n inputs of said second impedance transformer, the electrical lengths of said conductors being such that each analog signal is phase-shifted by the same angle, disregarding multiples of $2\pi$; an HF circuit having first and second inputs, a sum output for supplying thereto the sum of its input signals, and a difference output for supplying thereto the difference of its input signals, said first and second inputs of said HF circuit being respectively coupled to said outputs of said first and second impedance transformers; and measuring means, responsive to the "difference in depth of modulation" ILS parameter, coupled to said sum and difference outputs.

2. A monitor as claimed in claim 1, wherein said first input of said HF circuit is coupled to said output of said first impedance transformer through a variable phase-shifter.

3. A monitor as claimed in claim 1, wherein said measuring means include a series circuit having an input coupled to said difference output, and comprising a variable attenuator and a variable phase-shifter, said series circuit having an output.

4. A monitor as claimed in claim 3, wherein said measuring means comprise a power divider having an input coupled to said sum output, and first and second outputs, and an adding circuit having two inputs respectively coupled to said second output of said power divider and to said output of said series circuit, and an output, said first output of said power divider and said output of said adding circuit respectively feeding two circuits respectively responsive to the "difference in depth of modulation" ILS parameter in the HF signal applied thereto.

5. A monitor as claimed in claim 4, for a beacon comprising in addition to said lateral antennas a central antenna for radiating at least part of the ILS reference signal, wherein said sum output is coupled to said input of said power divider through a further adding circuit, said further adding circuit having a first input coupled to said sum output, and a second input coupled for receiving an analog signal representative of the current in said central antenna.

* * * * *